(12) United States Patent
Kim et al.

(10) Patent No.: US 12,545,081 B2
(45) Date of Patent: Feb. 10, 2026

(54) HEAT PUMP SYSTEM FOR VEHICLE

(71) Applicants: Hyundai Motor Company, Seoul (KR); Kia Corporation, Seoul (KR); Doowon Climate Control Co., Ltd., Asan-si (KR)

(72) Inventors: Jeawan Kim, Hwaseong-si (KR); Jae Yeon Kim, Hwaseong-si (KR); Man Hee Park, Suwon-si (KR); Chul Min Kim, Asan-si (KR)

(73) Assignees: Hyundai Motor Company, Seoul (KR); Kia Corporation, Seoul (KR); Doowon Climate Control Co., Ltd., Asan-Si (KR)

( * ) Notice: Subject to any disclaimer, the term of this patent is extended or adjusted under 35 U.S.C. 154(b) by 125 days.

(21) Appl. No.: 18/607,709

(22) Filed: Mar. 18, 2024

(65) Prior Publication Data

US 2025/0128574 A1    Apr. 24, 2025

(30) Foreign Application Priority Data

Oct. 19, 2023  (KR) .......... 10-2023-0140278

(51) Int. Cl.
*B60H 1/32*  (2006.01)
*B60H 1/00*  (2006.01)

(52) U.S. Cl.
CPC ....... *B60H 1/3228* (2019.05); *B60H 1/00278* (2013.01); *B60H 2001/3286* (2013.01)

(58) Field of Classification Search
CPC ............................................ B60H 2001/00307
See application file for complete search history.

(56) References Cited

U.S. PATENT DOCUMENTS

| 11,254,190 | B2 | 2/2022 | He et al. | |
|---|---|---|---|---|
| 2022/0185067 | A1 | 6/2022 | Kim et al. | |
| 2025/0042222 | A1* | 2/2025 | Kim | B60H 1/00921 |
| 2025/0153538 | A1* | 5/2025 | Kim | B60H 1/00921 |
| 2025/0153540 | A1* | 5/2025 | Kim | B60H 1/00921 |
| 2025/0249725 | A1* | 8/2025 | Kim | B60H 1/3229 |

FOREIGN PATENT DOCUMENTS

| KR | 20200040432 A | 4/2020 |
|---|---|---|
| KR | 20200130982 A | 11/2020 |
| KR | 20200138455 A | 12/2020 |
| KR | 20200143787 A | 12/2020 |
| KR | 20220033593 A | 3/2022 |
| KR | 20220082430 A | 6/2022 |

* cited by examiner

*Primary Examiner* — Marc E Norman
(74) *Attorney, Agent, or Firm* — Slater Matsil, LLP

(57) ABSTRACT

A heat pump system for a vehicle can improve cooling and heating performance by increasing a flow amount of the refrigerant by employing a gas injection device selectively operated in at least one mode selected for air conditioning of a vehicle interior, and the heat pump system can include a compressor, a condenser, a first heat-exchanger, a second heat-exchanger, a first expansion valve, an evaporator, a first refrigerant connection line, a chiller, a second expansion valve, and a gas injection device, where flowing movement of the refrigerant can be controlled according to at least one mode for temperature adjustment of a vehicle interior and/or temperature adjustment of a battery module.

20 Claims, 6 Drawing Sheets

HEAT PUMP SYSTEM FOR VEHICLE

CROSS-REFERENCE TO RELATED APPLICATIONS

This application claims the benefit of Korean Patent Application No. 10-2023-0140278, filed on Oct. 19, 2023, which application is hereby incorporated herein by reference.

TECHNICAL FIELD

The present disclosure relates to a heat pump system for a vehicle.

BACKGROUND

Generally, an air conditioning system for a vehicle includes an air conditioner unit circulating a refrigerant to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Recently, in accordance with a continuous increase in interest in energy efficiency and an environmental pollution problem, the development of an environmentally-friendly vehicle capable of substantially substituting for an internal combustion engine vehicle is required, and the environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

The electric vehicle driven by a power source of a fuel cell generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed to secure performance of the motor.

Therefore, in the hybrid vehicle or the electric vehicle according to the related art, cooling systems, a heat pump system, and a battery cooling system, respectively, should be configured as separate closed circuits so as to prevent heat generation of the motor, an electric component, and the battery including a fuel cell.

Therefore, a size and a weight of a cooling module located at the front of the vehicle are increased, and a layout of connection pipes supplying a refrigerant and a coolant to each of the heat pump system, the cooling systems, and the battery cooling system in an engine compartment becomes complicated.

In addition, because a battery cooling system for heating or cooling the battery according to a state of the vehicle is separately provided to obtain an optimal performance of the battery, a plurality of valves for selectively interconnecting connections pipes are employed, and thus noise and vibration due to frequent opening and closing operations of the valves may be introduced into the vehicle interior, thereby deteriorating the ride comfort.

In addition, when heating the vehicle interior, the heating performance may be deteriorated due to the lack of a heat source, the electricity consumption may be increased due to the usage of the electric heater, and the power consumption of the compressor may be increased.

The above information disclosed in this Background section is only for improvement of understanding of the background of the present disclosure, and therefore it may contain information that does not form the prior art that is already publicly known, available, or in use.

SUMMARY

The present disclosure relates to a heat pump system for a vehicle. More particularly, the present disclosure relates to a heat pump system for a vehicle capable of improving cooling and heating performance by applying a gas injection device selectively operating in an air conditioning mode of vehicle interior.

Some embodiments of the present disclosure can provide a heat pump system for a vehicle capable of improving cooling and heating performance by increasing the flow amount of the refrigerant by employing a gas injection device selectively operated in at least one mode selected for air conditioning of a vehicle interior.

In an embodiment of the present disclosure, a heat pump system for a vehicle may include a compressor configured to compress a refrigerant, a condenser connected to the compressor through a refrigerant line, a first heat-exchanger connected to the condenser through the refrigerant line, and configured to condensate or evaporate the refrigerant, a second heat-exchanger connected to the first heat-exchanger through the refrigerant line, a first expansion valve connected to the second heat-exchanger through the refrigerant line, an evaporator connected to the first expansion valve through the refrigerant line, a first refrigerant connection line having a first end connected to the refrigerant line between the compressor and the evaporator, and a second end connected to the refrigerant line between the second heat-exchanger the first expansion valve, a chiller provided in the first refrigerant connection line, and configured to adjust the temperature of the coolant by heat-exchanging the refrigerant introduced into the first refrigerant connection line with a selectively introduced coolant, a second expansion valve provided in the first refrigerant connection line in an upstream of the chiller, and a gas injection device connected to the refrigerant line, and configured to selectively expand and flow the refrigerant supplied from the condenser, or the refrigerant having passed through at least one of the first heat-exchanger and the second heat-exchanger, and to selectively supply a partial refrigerant among the supplied refrigerant to the compressor to increase the flow amount of the refrigerant circulating the refrigerant line, where flowing movement of the refrigerant is controlled according to at least one mode for temperature adjustment of a vehicle interior, or temperature adjustment of a battery module.

In an embodiment of the present disclosure, the gas injection device may include a first valve provided in the refrigerant line between the condenser and the first heat-exchanger, a second refrigerant connection line having a first end connected to the first valve, a gas-liquid separator provided in the second refrigerant connection line, and configured to separate and selectively discharge a gaseous refrigerant and a liquid refrigerant from the interiorly introduced refrigerant, a third expansion valve provided in the second refrigerant connection line between the first valve and the gas-liquid separator, a supply line having a first end connected to the gas-liquid separator, and a second end connected to the compressor, a fourth expansion valve provided in the refrigerant line between the first valve and the first heat-exchanger, and a second valve provided in a second end of the second refrigerant connection line.

In an embodiment of the present disclosure, the gas-liquid separator may be operated when the third expansion valve expands and supplies the refrigerant in a state of cooling or heating the vehicle interior, and may be configured to supply the gaseous refrigerant among the supplied refrigerant to the compressor through the supply line to increase the flow amount of the refrigerant circulating the refrigerant line.

In an embodiment of the present disclosure, the gas injection device may further include a first line having a first end connected to the refrigerant line between the first valve the fourth expansion valve, and a second end connected to the second valve, a second line having a first end connected to the second valve, and a second end connected to the refrigerant line between the second heat-exchanger and a second end of the first refrigerant connection line, a third valve provided in the refrigerant line between the second heat-exchanger and a second end of the second line, and a third line having a first end connected to the third valve, and a second end connected to the second refrigerant connection line between the first valve the third expansion valve.

In an embodiment of the present disclosure, the gas injection device may further include a fourth valve provided in the refrigerant line between the first heat-exchanger and the second heat-exchanger, and a fourth line having a first end connected to the fourth valve, and a second end connected to the refrigerant line between the evaporator the compressor.

In an embodiment of the present disclosure, the at least one mode may include a first mode in which the gas injection device is operated, and the battery module is cooled while the vehicle interior is cooled, a second mode in which the gas injection device is operated and the vehicle interior is heated, a third mode in which the gas injection device is not operated and the battery module is cooled while cooling the vehicle interior, a fourth mode in which the gas injection device is not operated and the vehicle interior is heated, and a fifth mode in which the vehicle interior is heated and dehumidified.

In the first mode, the first refrigerant connection line may be opened by an operation of the second expansion valve, a portion of the second refrigerant connection line connecting the first valve and a second end of the third line may be closed by an operation of the first valve, a remaining portion of the second refrigerant connection line connecting the second end of the third line and the second valve may be opened by an operation of the third expansion valve, the supply line may be opened, the first line may be closed by an operation of the second valve, the second line may be opened by the operation of the second valve, the third line may be opened by an operation of the third valve, the fourth line may be closed by an operation of the fourth valve, the refrigerant line connecting the condenser and the first heat-exchanger may be opened by an operation of the first valve and the fourth expansion valve, the refrigerant line connecting the first heat-exchanger and the second heat-exchanger may be opened by the operation of the fourth valve, the refrigerant line connecting the third valve and the second end of the second line may be closed by the operation of the third valve, the first expansion valve expands the refrigerant introduced from the gas-liquid separator along the second line and the refrigerant line and supplies the expanded refrigerant to the gas-liquid separator, the second expansion valve expands the refrigerant introduced into the first refrigerant connection line and supplies the expanded refrigerant to the gas-liquid separator, the third expansion valve expands the refrigerant supplied from the second heat-exchanger through the third line and supplies the expanded refrigerant to the gas-liquid separator, the fourth expansion valve flows the refrigerant supplied through the refrigerant line to the first heat-exchanger without expansion, and the gas-liquid separator may be configured to supply the gaseous refrigerant among the supplied refrigerant to the compressor through the opened supply line, and to discharge the liquid refrigerant to the second line through the second valve.

In the second mode, the first refrigerant connection line may be closed by an operation of the second expansion valve, the second refrigerant connection line may be opened by an operation of the first valve and the third expansion valve, the supply line may be opened, the first line may be opened by an operation of the second valve, the second line may be closed by the operation of the second valve, the third line may be closed by an operation of the third valve, the fourth line may be opened by an operation of the fourth valve, the refrigerant line connecting the condenser and the first heat-exchanger may be closed by an operation of the first valve, the refrigerant line connecting the second heat-exchanger and the fourth valve may be closed by the operation of the fourth valve, the refrigerant line connecting a rear end of the second heat-exchanger to the evaporator may be closed by an operation of the third valve and the first expansion valve, the first expansion valve and the second expansion valve stops operating, the third expansion valve expands the refrigerant supplied from the condenser and supplies the expanded refrigerant to the gas-liquid separator, the fourth expansion valve expands the refrigerant supplied from the gas-liquid separator through the first line and supplies the expanded refrigerant to the gas-liquid separator, the gas-liquid separator supplies the gaseous refrigerant among the supplied refrigerant to the compressor through the opened supply line.

In the third mode, the first refrigerant connection line may be opened by an operation of the second expansion valve, the second refrigerant connection line may be closed by an operation of the first valve, the supply line may be closed, the first line and the second line may be closed by an operation of the second valve, the third line may be closed by an operation of the third valve, the fourth line may be closed by an operation of the fourth valve, the first expansion valve expands the refrigerant introduced from the second heat-exchanger along the refrigerant line and supplies the expanded refrigerant to the gas-liquid separator, the second expansion valve expands the refrigerant introduced into the first refrigerant connection line and supplies the expanded refrigerant to the gas-liquid separator, the third expansion valve stops operating, the fourth expansion valve flows the refrigerant supplied through the refrigerant line to the first heat-exchanger without expansion.

In the fourth mode, the first refrigerant connection line may be closed by an operation of the second expansion valve, the second refrigerant connection line may be closed by an operation of the first valve, the supply line may be closed, the first line and the second line may be closed by an operation of the second valve, the third line may be closed by an operation of the third valve, the fourth line may be opened by an operation of the fourth valve, the refrigerant line connecting the second heat-exchanger and the fourth valve may be closed by the operation of the fourth valve, the refrigerant line connecting a rear end of the second heat-exchanger to the evaporator may be closed by an operation of the third valve and the first expansion valve, the first expansion valve, the second expansion valve, and the third expansion valve stops operating, and the fourth expansion valve expands the refrigerant supplied from the condenser and flows the expanded refrigerant to the first heat-exchanger.

In the fifth mode, the first refrigerant connection line may be closed by an operation of the second expansion valve, the second refrigerant connection line may be closed by an operation of the first valve, the supply line may be closed, the first line and the second line may be opened by an operation of the second valve, the third line may be closed by an operation of the third valve, the fourth line may be opened by an operation of the fourth valve, the refrigerant line connecting the second heat-exchanger and the second end of the second line may be closed by the operation of the fourth valve, the refrigerant line connecting the second end of the second line and the evaporator may be opened by an operation of the first expansion valve, a partial refrigerant among the refrigerant flowing from the condenser along the refrigerant line flows along the first line and the second line, a remaining refrigerant among the refrigerant introduced from the condenser along the refrigerant line flows into the fourth expansion valve, the first expansion valve expands the refrigerant supplied to the refrigerant line and supplies the expanded refrigerant to the gas-liquid separator, the second expansion valve and the third expansion valve stops operating, and the fourth expansion valve expands the refrigerant supplied through the refrigerant line and flows the expanded refrigerant to the first heat-exchanger.

In an embodiment of the present disclosure, the first heat-exchanger and the second heat-exchanger may be configured to condense the refrigerant supplied in the first mode and the third mode.

In an embodiment of the present disclosure, the first heat-exchanger may be configured to evaporate the refrigerant supplied in the second mode, the fourth mode, and the fifth mode.

In an embodiment of the present disclosure, a heat pump system for a vehicle may further include an accumulator provided in the refrigerant line between the evaporator and the compressor.

In an embodiment of the present disclosure, a second end of the fourth line may be connected to the refrigerant line through the accumulator.

In an embodiment of the present disclosure, the first expansion valve, the second expansion valve, the third expansion valve, and the fourth expansion valve may be 2-Way expansion valves selectively operated in the at least one mode, and configured to selectively expand the refrigerant while controlling flowing of the supplied refrigerant.

In an embodiment of the present disclosure, the first heat-exchanger may be connected to an electrical component through a first coolant line through which the coolant circulates.

In an embodiment of the present disclosure, the chiller may be connected to the battery module through a second coolant line through which the coolant circulates.

In an embodiment of the present disclosure, when the battery module is to be cooled, the second coolant line may be opened to connect the chiller and the battery module.

As described above, with a heat pump system for a vehicle according to an embodiment of the present disclosure, by increasing the flow amount of the refrigerant by employing a gas injection device selectively operated in at least one mode selected for air conditioning of a vehicle interior, cooling and heating performance may be improved.

In addition, according to an embodiment of the present disclosure, performance of the system may be maximized by using the gas injection device while minimizing the number of required components, and thus streamlining and simplification of the system may be achieved.

In addition, according to an embodiment of the present disclosure, it is possible to reduce manufacturing cost and weight through simplification of an entire system, and to improve space utilization.

DETAILED DESCRIPTION OF ILLUSTRATIVE EMBODIMENTS

Figure 1:
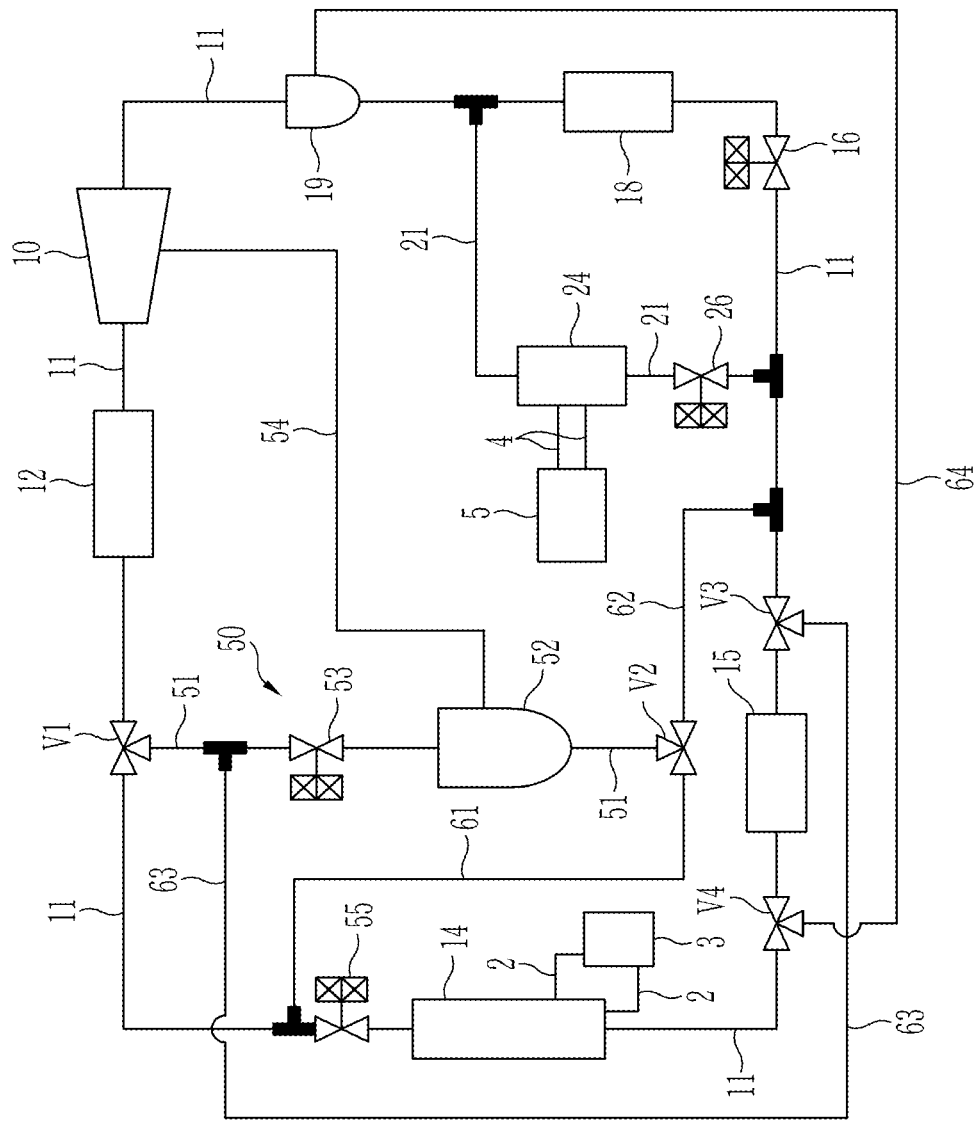
FIG. 1 is a block diagram of a heat pump system for a vehicle according to an embodiment of the present disclosure.

Example embodiments of the present disclosure will hereinafter be described in detail with reference to the accompanying drawings.

Example embodiments disclosed in the present specification and the constructions depicted in the drawings are only some examples, and do not necessarily cover the entire scope of the present disclosure. Therefore, it can be understood that there may be various equivalents and variations for various embodiments of the present disclosure.

To clarify the present disclosure, parts that are not related to the description can be omitted, and same elements or equivalents can be referred to with same reference numerals throughout the specification.

Also, the size and thickness of each element are arbitrarily shown in the drawings, but the present disclosure is not necessarily limited thereto, and in the drawings, the thickness of layers, films, panels, regions, etc., can be exaggerated for clarity.

In addition, unless explicitly described to the contrary, the word "comprise" and variations such as "comprises" or "comprising", can be understood to imply the inclusion of stated elements but not the exclusion of any other elements.

Furthermore, each of terms, such as " . . . unit", " . . . means", " . . . portions", " . . . part", and " . . . member" described in the specification, can refer to a unit of a comprehensive element that performs at least one function or operation.

FIG. 1 is a block diagram of a heat pump system for a vehicle according to an embodiment of the present disclosure.

A heat pump system for a vehicle according to an embodiment may improve cooling and heating performance by employing a gas injection device 50 selectively operating in at least one mode selected for air-conditioning of a vehicle interior.

In the heat pump system of an electric vehicle, a cooling apparatus circulating a coolant may be interconnected with an air conditioner unit that is an air-conditioner apparatus for cooling and heating the vehicle interior.

Referring to FIG. 1, the heat pump system may include the cooling apparatus and the air conditioner unit provided with a compressor 10, a condenser 12, a first heat-exchanger 14, a second heat-exchanger 15, a first expansion valve 16, an evaporator 18, a first refrigerant connection line 21, a chiller 24, a second expansion valve 26, and the gas injection device 50.

First, the cooling apparatus may include an electrical component 3 and a battery module 5 through which the coolant circulates.

The cooling apparatus may further include a radiator (not shown). The radiator may be located in a frontal region of the vehicle. A cooling fan (not shown) may be provided at a rear of the radiator. Accordingly, the radiator may cool the coolant through an operation of the cooling fan and heat-exchange with an ambient air.

The electrical component 3 may be connected to the first heat-exchanger 14 through a first coolant line 2 through which the coolant circulates. In the cooling or the heating mode of the vehicle interior, the first coolant line 2 may be opened to supply the coolant to the first heat-exchanger 14.

The battery module 5 may be connected to the chiller 24 through a second coolant line 4 through which the coolant circulates.

When cooling the battery module 5, or when a waste heat of the battery module 5 is to be recollected at the time of heating the vehicle interior, the second coolant line 4 may be opened to connect the chiller 24 and the battery module 5.

The coolant may selectively circulate through the first coolant line 2 and the second coolant line 4 by an operation of a water pump (not shown).

The electrical component 3 may include an electric power control unit (EPCU), or a motor, or an inverter, or an on-board charger (OBC), or an autonomous driving controller, or the like.

The electric power control apparatus, or the inverter, or the motor, or the autonomous driving controller may generate heat while the vehicle is being driven, and the charger may generate heat when charging the battery module 5.

That is, at the time of heating the vehicle interior, when a waste heat of the electrical component 3 is to be recollected, the heat generated from the electric power control apparatus, motor, inverter, or charger, or the autonomous driving controller may be recollected.

In the present embodiment, the compressor 10 may compress the supplied refrigerant.

The condenser 12 may be connected to the compressor 10 through a refrigerant line 11. The condenser 12 and the evaporator 18 may be provided in an interior of a HVAC module (not shown).

In addition, an opening/closing door may be further provided inside the HVAC module, the ambient air having passed through the evaporator 18 may be selectively introduced to the condenser 12 at the time of cooling or heating of the vehicle interior.

That is, in the case of heating the vehicle interior, the opening/closing door may be opened such that the ambient air having passed through the evaporator 18 may be introduced into the condenser 12.

To the contrary, when cooling the vehicle interior, the opening/closing door may close a side toward the condenser 12 such that the ambient air cooled while passing through the evaporator 18 may be directly introduced into the vehicle interior.

In the present embodiment, the first heat-exchanger 14 may be connected to the condenser 12 through the refrigerant line 11. The first heat-exchanger 14 may selectively condensate or evaporate the refrigerant by heat-exchanging the refrigerant supplied from the condenser 12 with the coolant introduced through the first coolant line 2.

That is, the first heat-exchanger 14 may be provided as a water-cooled heat-exchanger connected to the first coolant line 2 through which the coolant is circulated, and configured to heat-exchange the coolant and the refrigerant.

The second heat-exchanger 15 may be connected to the first heat-exchanger 14 through the refrigerant line 11.

The second heat-exchanger 15 may be provided as an air-cooled heat-exchanger located at a rear of the radiator in a frontal region of the vehicle and configured to heat-exchange the air and the refrigerant.

The first expansion valve 16 may be provided in the refrigerant line 11 between the second heat-exchanger 15 and the evaporator 18.

In addition, the evaporator 18 may be connected to the first expansion valve 16 through the refrigerant line 11. When the refrigerant expanded by the first expansion valve 16 is introduced, the evaporator 18 may evaporate the refrigerant by heat-exchanging with the air introduced into the HVAC module.

An accumulator 19 may be provided in the refrigerant line 11 between the evaporator 18 and the compressor 10. The accumulator 19 may only supply the gaseous refrigerant to the compressor 10, thereby improving efficiency and durability of the compressor 10.

In the present embodiment, a first end of the first refrigerant connection line 21 may be connected to the refrigerant line 11 between the compressor 10 the evaporator 18. A second end of the first refrigerant connection line 21 may be connected to the refrigerant line 11 between the second heat-exchanger 15 the first expansion valve 16.

The chiller 24 may be provided in the first refrigerant connection line 21. The coolant may selectively circulate through the chiller 24 through the second coolant line 4.

That is, the chiller 24 may be a water-cooled heat-exchanger through which the coolant circulates.

Accordingly, the chiller 24 may adjust the temperature of the coolant by heat-exchanging the refrigerant introduced into the first refrigerant connection line 21 with the coolant selectively introduced through the second coolant line 4.

In the present embodiment, the second expansion valve 26 may be provided in the first refrigerant connection line 21 in an upstream of the chiller 24.

Upstream of the chiller 24 and a rear end of the chiller 24 may be set based on a flow direction of the refrigerant.

That is, based on a direction in which the refrigerant flows along the first refrigerant connection line 21, a location from which the refrigerant flows into the chiller 24 may be defined as the upstream of the chiller 24, and a location to which the refrigerant is discharged from the chiller 24 may be defined as the rear end of the chiller 24.

When cooling the battery module 5 by using the coolant heat-exchanged with the refrigerant, the second expansion valve 26 may expand the refrigerant introduced through the first refrigerant connection line 21 and flow the expanded refrigerant to the chiller 24.

That is, when cooling of the battery module 5 is required, the second expansion valve 26 may expand the refrigerant introduced into the first refrigerant connection line 21 to lower the temperature and flow the expanded refrigerant to the chiller 24, and thereby, the temperature of the coolant passing through the interior of the chiller 24 may be further lowered.

Accordingly, the battery module 5 may be more efficiently cooled, by flowing the coolant having the lowered temperature while passing through the chiller 24.

In addition, the gas injection device 50 may be connected to the refrigerant line 11.

The gas injection device 50 may selectively expand and flow the refrigerant supplied from the condenser 12, or the refrigerant having passed through at least one of the first heat-exchanger 14 and the second heat-exchanger 15.

Simultaneously, the gas injection device 50 may increase an overall flow amount of the refrigerant circulating the refrigerant line 11 by selectively supplying a partial refrigerant among the supplied refrigerant to the compressor 10.

The gas injection device 50 may include a first valve V1, a second refrigerant connection line 51, a gas-liquid separator 52, a third expansion valve 53, a supply line 54, a fourth expansion valve 55, and a second valve V2.

First, the first valve V1 may be provided in the refrigerant line 11, between the condenser 12 and the first heat-exchanger 14.

A first end of the second refrigerant connection line 51 may be connected to the first valve V1.

The gas-liquid separator 52 may be provided in the second refrigerant connection line 51. The gas-liquid separator may separate and selectively discharge a gaseous refrigerant and a liquid refrigerant from an interiorly introduced refrigerant.

In the present embodiment, the third expansion valve 53 may be provided in the second refrigerant connection line 51 between the first valve V1 and the gas-liquid separator 52.

A first end of the supply line 54 may be connected to the gas-liquid separator 52. A second end of the supply line 54 may be connected to the compressor 10.

The supply line 54 configured as such may selectively supply the gaseous refrigerant discharged from the gas-liquid separator 52 to the compressor 10.

That is, the gas-liquid separator 52 may be operated when the third expansion valve 53 expands and supplies the refrigerant, in a state of cooling or heating the vehicle interior.

The gas-liquid separator 52 may supply the gaseous refrigerant among the supplied refrigerant to the compressor 10 through the supply line 54, such that flow amount of the refrigerant circulating the refrigerant line 11 may be increased.

In the present embodiment, the fourth expansion valve 55 may be provided in the refrigerant line 11 between the first valve V1 and the first heat-exchanger 14. In addition, the second valve V2 may be provided at a second end of the second refrigerant connection line 51.

The gas injection device 50 configured as such may further include a first line 61, a second line 62, a third valve V3, a third line 63, a fourth valve V4, and a fourth line 64.

First, a first end of the first line 61 may be connected to the refrigerant line 11 between the first valve V1 the fourth expansion valve 55. A second end of the first line 61 may be connected to the second valve V2.

In the heating mode of the vehicle interior, the first line 61 configured as such may selectively supply the liquid refrigerant discharged from the gas-liquid separator 52 to the fourth expansion valve 55.

In the present embodiment, a first end of the second line 62 may be connected to the second valve V2. A second end of the second line 62 may be connected to the refrigerant line 11 between the second heat-exchanger 15 and the second end of the first refrigerant connection line 21.

In a cooling mode of the vehicle interior, the second line 62 configured as such may supply the liquid refrigerant discharged from the gas-liquid separator 52 to the first refrigerant connection line 21 or the first expansion valve 16 through the refrigerant line 11.

The third valve V3 may be provided in the refrigerant line 11 between the second heat-exchanger 15 and the second end of the second line 62.

In the present embodiment, a first end of the third line 63 may be connected to the third valve V3. A second end of the third line 63 may be connected to the second refrigerant connection line 51 between the first valve V1 the third expansion valve 53.

The fourth valve V4 may be provided in the refrigerant line 11 between the first heat-exchanger 14 and the second heat-exchanger 15.

In addition, a first end of the fourth line 64 may be connected to the fourth valve V4. A second end of the fourth line 64 may be connected to the refrigerant line 11 between the evaporator 18 the compressor 10.

In more detail, the second end of the fourth line 64 may be connected to the refrigerant line 11 through the accumulator 19.

In the heating mode of the vehicle interior, the fourth line 64 configured as such may bypass the refrigerant discharged from the first heat-exchanger 14 to the accumulator 19 without passing through the second heat-exchanger 15.

The first valve V1, the second valve V2, the third valve V3, and the fourth valve v4 may be a 3-way valve capable of distributing flow amount while controlling flowing of the refrigerant.

In the heat pump system configured as such, the flowing movement of the refrigerant may be controlled according to at least one mode for temperature adjustment of the vehicle interior or temperature adjustment of the battery module.

The first expansion valve 16, the second expansion valve 26, the third expansion valve 53, and the fourth expansion valve 55 may be selectively operated in the at least one mode.

That is, each of the first expansion valve 16, the second expansion valve 26, the third expansion valve 53, and the fourth expansion valve 55 may be a 2-Way expansion valve that selectively expands the refrigerant while controlling flowing of the supplied refrigerant.

The at least one mode may include a first mode to a fifth mode.

In the first mode, the gas injection device 50 may be operated, and the battery module 5 may be cooled while the vehicle interior is cooled.

In the second mode, the gas injection device 50 may be operated, and the vehicle interior may be heated.

In the third mode, the gas injection device 50 may not be operated, and the battery module 5 may be cooled while the vehicle interior is cooled.

In the present embodiment, in the fourth mode, the gas injection device 50 may not be operated, and the vehicle interior may be heated.

In addition, the fifth mode may heat and dehumidify the vehicle interior.

The first heat-exchanger 14 and the second heat-exchanger 15 may condense the refrigerant supplied in the first mode and the third mode.

To the contrary, the first heat-exchanger 14 may evaporate the refrigerant supplied in the second mode, the fourth mode, and the fifth mode.

An operation and action in each mode of a heat pump system according to an embodiment configured as such will be described in detail with reference to FIG. 2 to FIG. 6.

First, the operation according to the first mode of a heat pump system according to an embodiment, in which the gas injection device 50 is operated and the battery module 5 is cooled while cooling the vehicle interior, will be described with reference to FIG. 2.

Figure 2:
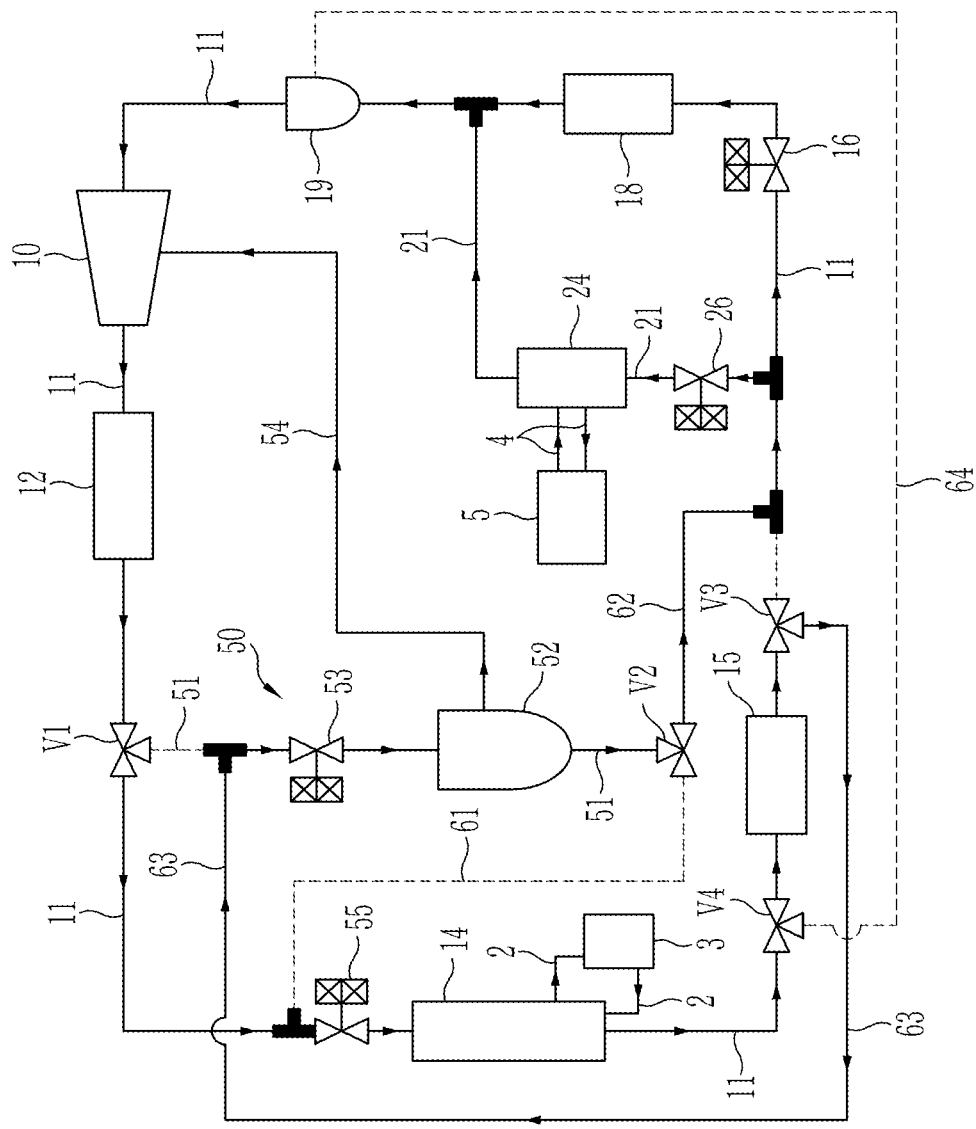
FIG. 2 is an operation diagram of a heat pump system for a vehicle according to an embodiment of the present disclosure, in a first mode.

FIG. 2 is an operation diagram of a heat pump system for a vehicle according to an embodiment of the present disclosure, in the first mode.

Referring to FIG. 2, in the case of the first mode, to cool the vehicle interior, the compressor 10 may be operated such that the refrigerant may flow along the refrigerant line 11.

The first refrigerant connection line 21 may be opened by an operation of the second expansion valve 26.

A portion of the second refrigerant connection line 51 connecting the first valve V1 and the second end of the third line 63 may be closed by an operation of the first valve V1.

Simultaneously, a remaining portion of the second refrigerant connection line 51 connecting the second end of the third line 63 and the second valve V2 may be opened by an operation of the third expansion valve 53.

In the present embodiment, the supply line 54 may be opened. In addition, the first line 61 may be closed by an operation of the second valve V2.

The second line 62 may be opened by the operation of the second valve V2. The third line 63 may be opened by an operation of the third valve V3. The fourth line 64 may be closed by an operation of the fourth valve V4.

At this mode, the refrigerant line 11 connecting the condenser 12 and the first heat-exchanger 14 may be opened by an operation of the first valve V1 and the fourth expansion valve 55.

In addition, the refrigerant line 11 connecting the first heat-exchanger 14 and the second heat-exchanger 15 may be opened by the operation of the fourth valve V4.

In addition, the refrigerant line 11 connecting the third valve V3 and the second end of the second line 62 may be closed by the operation of the third valve V3.

Then, the refrigerant supplied from the compressor 10 to the condenser 12 may flow into the fourth expansion valve 55 along the refrigerant line 11. The fourth expansion valve 55 may flow the refrigerant supplied through the refrigerant line 11 to the first heat-exchanger 14 without expansion.

The refrigerant introduced into the first heat-exchanger 14 may be condensed while being heat-exchanged with the coolant supplied from the electrical component 3 through the first coolant line 2. Thereafter, the refrigerant discharged from the first heat-exchanger 14 may flow into the second heat-exchanger 15 along the refrigerant line 11.

The second heat-exchanger 15 may additionally condense the introduced refrigerant by heat-exchange with the air. The refrigerant discharged from the second heat-exchanger 15 may flow along the third line 63 opened by the operation of the third valve V3.

At this mode, the third expansion valve 53 may expand the refrigerant introduced through the third line 63 and the second refrigerant connection line 51 from the second heat-exchanger 15 and supply the expanded refrigerant to the gas-liquid separator 52.

The gas-liquid separator 52 may supply the gaseous refrigerant among the refrigerant supplied from the third expansion valve 53 through the second refrigerant connection line 51 to the compressor 10 through the opened supply line 54.

That is, the gas injection device 50 may flow the gaseous refrigerant separated while passing through the gas-liquid separator 52 back to the compressor 10 through the supply line 54, and thereby the flow amount of the refrigerant circulating the refrigerant line 11 may be increased.

The gas-liquid separator 52 may discharge the liquid refrigerant among the refrigerant supplied through the second refrigerant connection line 51 to the second line 62 connected to the second refrigerant connection line 51 through the second valve V2.

A partial refrigerant among the refrigerant introduced into the refrigerant line 11 along the second line 62 may be introduced into the opened first refrigerant connection line 21, and a remaining refrigerant may flow into the first expansion valve 16.

The second expansion valve 26 may expand the refrigerant introduced into the first refrigerant connection line 21 and supply the expanded refrigerant to the chiller 24.

The refrigerant introduced into the chiller 24 may be heat-exchanged with the coolant supplied from the battery module 5 through the second coolant line 4, and thereby cool the coolant.

The coolant cooled in the chiller 24 may be supplied to the battery module 5 along the second coolant line 4. Accordingly, the battery module 5 may be efficiently cooled by the coolant cooled at the chiller 24.

That is, the coolant circulating the second coolant line 4 may efficiently cool the battery module 5 by repeatedly performing the above-described operation.

The first expansion valve 16 may expand the refrigerant introduced through the refrigerant line 11 and supply the expanded refrigerant to the evaporator 18.

The ambient air introduced into the HVAC module may be cooled by the low-temperature refrigerant introduced into the evaporator 18 while passing through the evaporator 18.

At this mode, the opening/closing door of the HVAC module may close a portion passing toward the condenser 12 such that the cooled ambient air may not pass through the condenser 12. Therefore, the cooled the ambient air may cool the vehicle interior, by being directly drawn to the vehicle interior.

The refrigerant having passed through the evaporator 18 and the chiller 24, respectively, may flow into the accumulator 19. Thereafter, the refrigerant may pass through the accumulator 19 and flow into the compressor 10.

That is, the refrigerant having passed through the evaporator 18 and the chiller 24, respectively, and the refrigerant supplied from the gas-liquid separator 52 through the supply line 54 may be introduced into the compressor 10. The introduced refrigerant may be compressed by an operation of the compressor 10.

The refrigerant compressed in the compressor 10 may pass through the condenser 12, and then may be supplied to the fourth expansion valve 55 along the refrigerant line 11.

Then, the heat pump system may repeatedly perform above-described processes.

That is, the heat pump system may increase the flow amount of the refrigerant flowing along the refrigerant line 11, while repeatedly performing the above-described operation.

In addition, the heat pump system may improve overall cooling performance and efficiency and efficiently cool the vehicle interior, by increasing the flow amount of the refrigerant flowing along the refrigerant line 11.

Simultaneously, the heat pump system may efficiently cool the battery module 5 by using the low-temperature coolant cooled in the chiller 24.

In the present embodiment, the operation according to the second mode in which the gas injection device 50 is operated and the vehicle interior is heated will be described with reference to FIG. 3.

Figure 3:
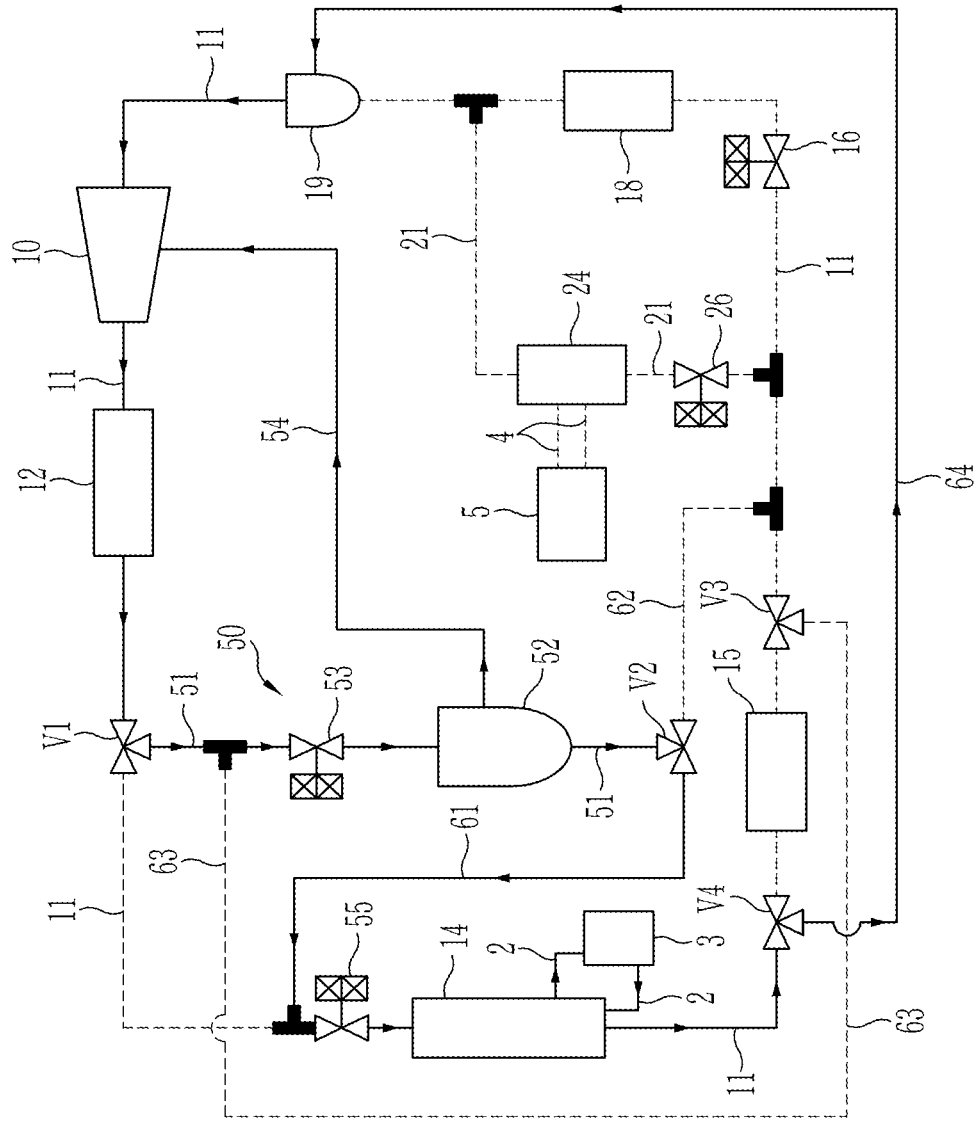
FIG. 3 is an operation diagram of a heat pump system for a vehicle according to an embodiment of the present disclosure, in a second mode.

FIG. 3 is an operation diagram of a heat pump system for a vehicle according to an embodiment of the present disclosure, in the second mode.

Referring to FIG. 3, in the case of the second mode, to heat the vehicle interior, the compressor 10 may be operated such that the refrigerant may flow along the refrigerant line 11.

The first refrigerant connection line 21 may be closed by the operation of the second expansion valve 26.

The second refrigerant connection line 51 may be opened by the operation of the first valve V1 and the third expansion valve 53. In addition, the supply line 54 may be opened.

In the present embodiment, the first line 61 may be opened by the operation of the second valve V2. The second line 62 may be closed by the operation of the second valve V2.

Simultaneously, the third line 63 may be closed by the operation of the third valve V3. In addition, the fourth line 64 may be opened by the operation of the fourth valve V4.

At this mode, the refrigerant line 11 connecting the condenser 12 and the first heat-exchanger 14 may be closed by the operation of the first valve V1. In addition, the refrigerant line 11 connecting the second heat-exchanger 15 and the fourth valve V4 may be closed by the operation of the fourth valve V4.

In addition, the refrigerant line 11 connecting a rear end of the second heat-exchanger 15 to the evaporator 18 may be closed by an operation of the third valve V3 and the first expansion valve 16.

The first expansion valve 16 and the second expansion valve 26 may stop operating.

An upstream of the second heat-exchanger 15 and the rear end of the second heat-exchanger 15 may be set based on the flow direction of the refrigerant.

That is, based on a direction in which the refrigerant flows along the refrigerant line 11, a location from which the refrigerant flows into the second heat-exchanger 15 may be defined as the upstream of the second heat-exchanger 15, and a location to which the refrigerant is discharged from the second heat-exchanger 15 may be defined as the rear end of the second heat-exchanger 15.

Then, the refrigerant supplied from the compressor 10 to the condenser 12 may flow into the third expansion valve 53 along the second refrigerant connection line 51.

The third expansion valve 53 may expand the refrigerant supplied from the condenser 12 and supply the expanded refrigerant to the gas-liquid separator 52.

The gas-liquid separator 52 may supply gaseous refrigerant among the supplied refrigerant to the compressor 10 through the opened supply line 54.

That is, the gas injection device 50 may flow the gaseous refrigerant separated while passing through the gas-liquid separator 52 back to the compressor 10 through the supply line 54, and thereby the flow amount of the refrigerant circulating the refrigerant line 11 may be increased.

The gas-liquid separator 52 may discharge the liquid refrigerant among the refrigerant supplied from the third expansion valve 53 to the first line 61 connected to the second refrigerant connection line 51 through the second valve V2.

The refrigerant flowing along the first line 61 may flow into the fourth expansion valve 55. The fourth expansion valve 55 may expand the refrigerant supplied from the gas-liquid separator 52 through the first line 61 and supply the expanded refrigerant to the first heat-exchanger 14.

The first heat-exchanger 14 may evaporate the introduced refrigerant through heat-exchange with the coolant supplied from the electrical component 3 to the first coolant line 2. The refrigerant discharged from the first heat-exchanger 14 may flow into the fourth line 64.

The refrigerant flowing along the fourth line 64 may flow into the accumulator 19. Thereafter, the refrigerant may pass through the accumulator 19 and flow into the compressor 10.

Then, the heat pump system may repeatedly perform above-described processes.

That is, the refrigerant having passed through the first heat-exchanger 14, and the refrigerant supplied from the gas-liquid separator 52 through the supply line 54 may be introduced into the compressor 10. The introduced refrigerant may be compressed by the operation of the compressor 10.

The refrigerant compressed in the compressor 10 may be supplied to the condenser 12 along the refrigerant line 11. The refrigerant supplied to the condenser 12 may increase the temperature of the ambient air introduced into the HVAC module.

The opening/closing door may be opened such that the ambient air introduced into the HVAC module and having passed through the evaporator 18 may pass through the condenser 12.

Accordingly, when passing through the evaporator 18 that is not supplied with the refrigerant, the ambient air introduced from the outside may be introduced into the evaporator 18 at a room temperature state without being cooled. Because the introduced ambient air is converted to a high-temperature state while passing through the condenser 12 and then introduced into the vehicle interior, the heating of the vehicle interior may be realized.

As such, in a heat pump system according to an embodiment, because the gas injection device 50 is operated together, the overall heating performance and efficiency may be improved.

In addition, according to the present disclosure, the heating efficiency and performance may be improved while minimizing usage of a separate electric heater.

In addition, because the gas injection device 50 increases the flow amount of the refrigerant circulating the refrigerant line 11, the heating performance may be maximized.

In the present embodiment, the operation according to the third mode in which the gas injection device 50 is not operated and the battery module 5 is cooled while cooling the vehicle interior will be described with reference to FIG. 4.

Figure 4:
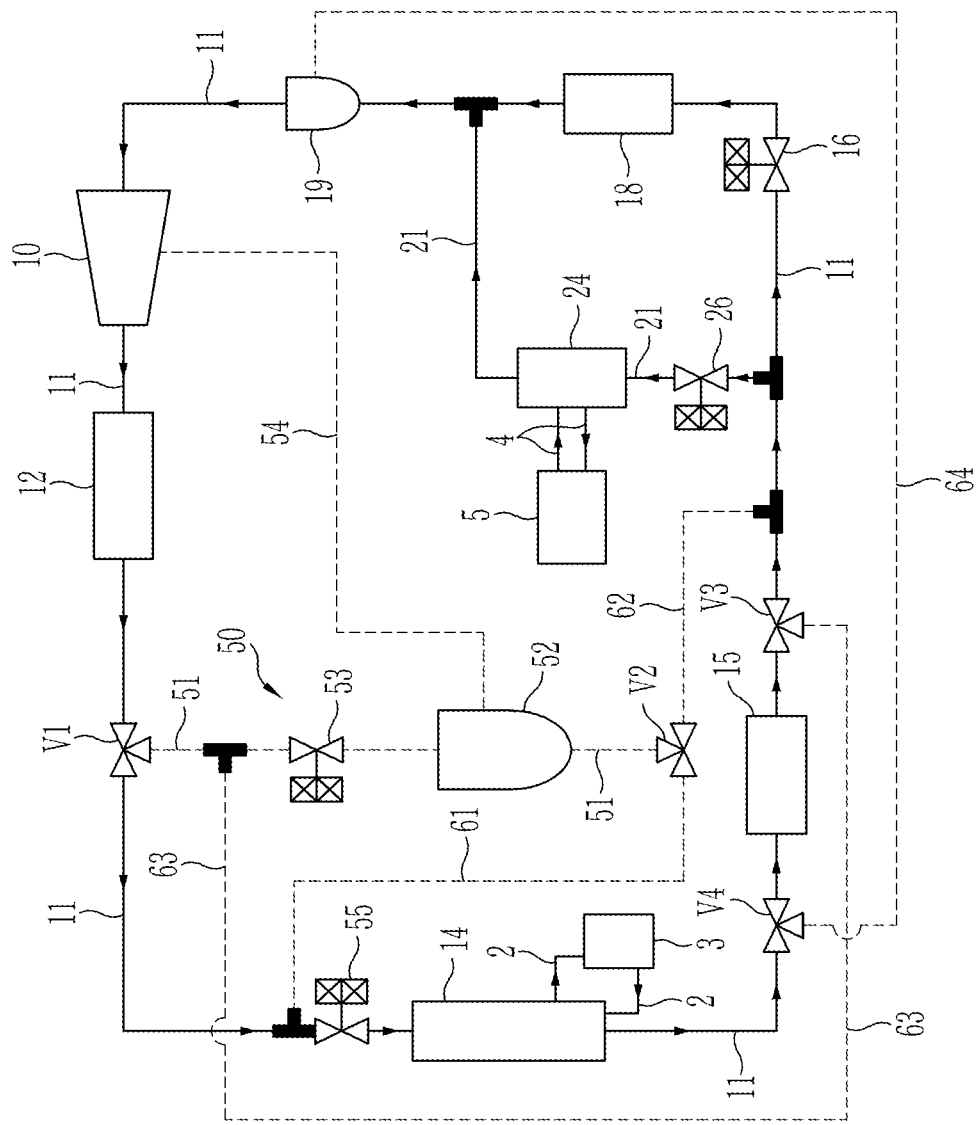
FIG. 4 is an operation diagram of a heat pump system for a vehicle according to an embodiment of the present disclosure, in a third mode.

FIG. 4 is an operation diagram of a heat pump system for a vehicle according to an embodiment of the present disclosure, in a third mode.

Referring to FIG. 4, in the case of the third mode, to cool the vehicle interior, the compressor 10 may be operated such that the refrigerant may flow along the refrigerant line 11.

The first refrigerant connection line 21 may be opened by the operation of the second expansion valve 26. In addition, the second refrigerant connection line 51 may be closed by the operation of the first valve V1.

The supply line 54 may be closed. The third expansion valve 53 may stop operating.

Simultaneously, the first line 61 and the second line 62 may be closed by the operation of the second valve V2.

The third line 63 may be closed by the operation of the third valve V3. In addition, the fourth line 64 may be closed by the operation of the fourth valve V4.

Then, the refrigerant supplied from the compressor 10 to the condenser 12 may flow into the fourth expansion valve 55 along the refrigerant line 11. The fourth expansion valve 55 may flow the refrigerant supplied from the condenser 12 through the refrigerant line 11 to the first heat-exchanger 14 without expansion.

The refrigerant introduced into the first heat-exchanger 14 may be condensed while being heat-exchanged with the coolant supplied from the electrical component 3 through the first coolant line 2. Thereafter, the refrigerant discharged from the first heat-exchanger 14 may flow into the second heat-exchanger 15 along the refrigerant line 11.

The second heat-exchanger 15 may additionally condense the introduced refrigerant by heat-exchange with the air. The refrigerant discharged from the second heat-exchanger 15 may flow along the refrigerant line 11 opened by the operation of the third valve V3.

A partial refrigerant among the refrigerant discharged from the second heat-exchanger 15 may be introduced into the opened first refrigerant connection line 21, and a remaining refrigerant may flow into the first expansion valve 16.

The second expansion valve 26 may expand the refrigerant introduced into the first refrigerant connection line 21 and supply the expanded refrigerant to the chiller 24.

The refrigerant introduced into the chiller 24 may be heat-exchanged with the coolant supplied from the battery module 5 through the second coolant line 4, and thereby cool the coolant.

The coolant cooled in the chiller 24 may be supplied to the battery module 5 along the second coolant line 4. Accordingly, the battery module 5 may be efficiently cooled by the coolant cooled at the chiller 24.

That is, the coolant circulating the second coolant line 4 may efficiently cool the battery module 5 by repeatedly performing the above-described operation.

The first expansion valve 16 may expand the refrigerant introduced through the refrigerant line 11 from the second heat-exchanger 15 and supply the expanded refrigerant to the evaporator 18.

The ambient air introduced into the HVAC module may be cooled by the low-temperature refrigerant introduced into the evaporator 18 while passing through the evaporator 18.

At this mode, the opening/closing door of the HVAC module may close a portion passing toward the condenser 12 such that the cooled ambient air may not pass through the condenser 12. Therefore, the cooled the ambient air may cool the vehicle interior, by being directly drawn to the vehicle interior.

The refrigerant having passed through the evaporator 18 and the chiller 24, respectively, may flow into the compressor 10.

That is, the refrigerant having passed through the evaporator 18 and the chiller 24, respectively, may flow into the compressor 10. The introduced refrigerant may be compressed by the operation of the compressor 10.

The refrigerant compressed in the compressor 10 may pass through the condenser 12, and then may be supplied to the fourth expansion valve 55 along the refrigerant line 11.

Then, the heat pump system may repeatedly perform above-described processes.

That is, the heat pump system may cool the vehicle interior without an operation of the gas injection device 50, while repeatedly performing the above-described operation.

Simultaneously, the heat pump system may efficiently cool the battery module 5 by using the low-temperature coolant cooled in the chiller 24.

In the present embodiment, the operation according to the fourth mode in which the gas injection device 50 is not operated and the vehicle interior is heated will be described with reference to FIG. 5.

Figure 5:
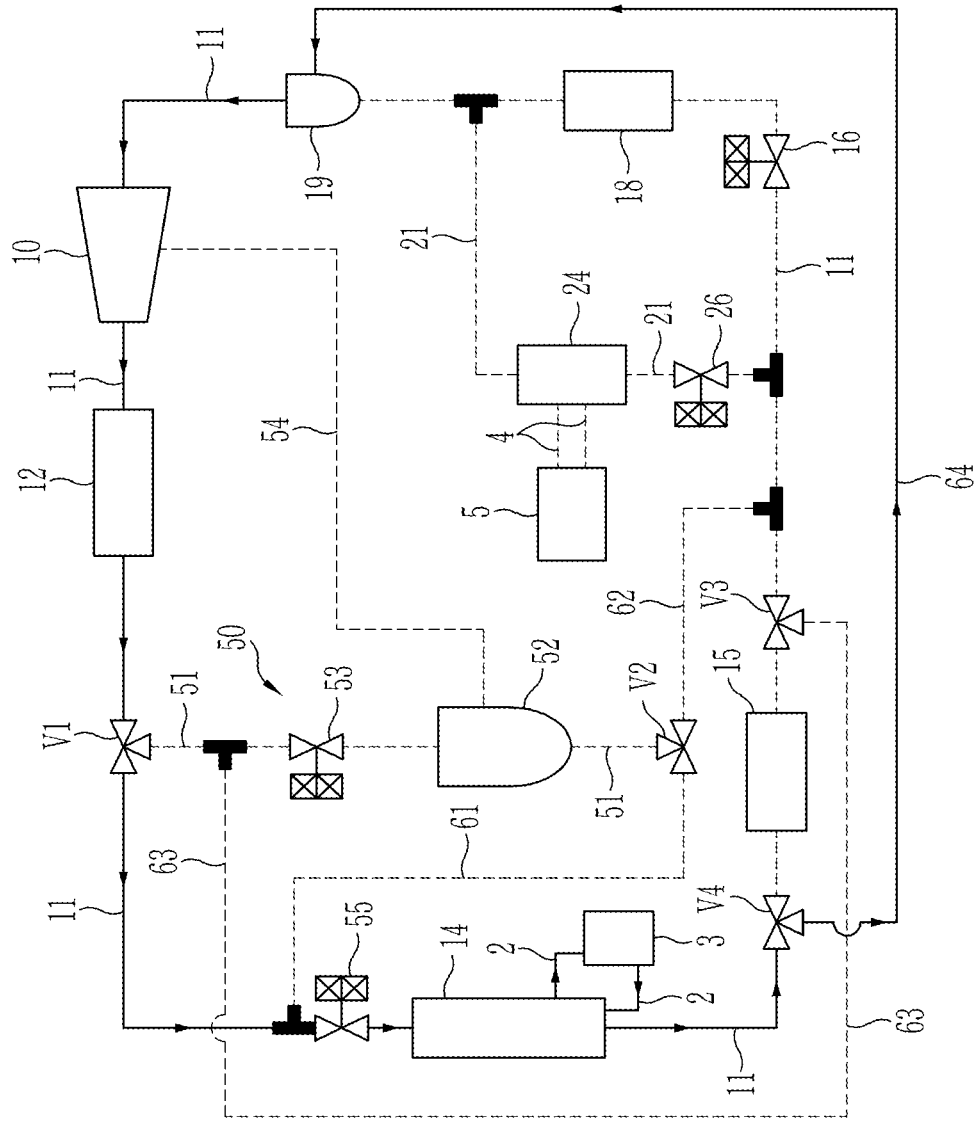
FIG. 5 is an operation diagram of a heat pump system for a vehicle according to an embodiment of the present disclosure, in a fourth mode.

FIG. 5 is an operation diagram of a heat pump system for a vehicle according to an embodiment of the present disclosure, in a fourth mode.

Referring to FIG. 5, in the case of the fourth mode, to heat the vehicle interior, the compressor 10 may be operated such that the refrigerant may flow along the refrigerant line 11.

The first refrigerant connection line 21 may be closed by the operation of the second expansion valve 26. The second refrigerant connection line 51 may be closed by the operation of the first valve V1.

The supply line 54 may be closed. The third expansion valve 53 may stop operating.

Simultaneously, the first line 61 and the second line 62 may be closed by the operation of the second valve V2.

The third line 63 may be closed by the operation of the third valve V3. In addition, the fourth line 64 may be opened by the operation of the fourth valve V4.

The refrigerant line 11 connecting the second heat-exchanger 15 and the fourth valve V4 may be closed by the operation of the fourth valve V4.

Simultaneously, the refrigerant line 11 connecting the rear end of the second heat-exchanger 15 to the evaporator 18 may be closed by the operation of the third valve V3 and the first expansion valve 16.

At this mode, the first expansion valve 16 and the second expansion valve 26 may stop operating.

Then, the refrigerant supplied from the compressor 10 to the condenser 12 may flow into the fourth expansion valve 55 along the refrigerant line 11. The fourth expansion valve 55 may expand the refrigerant supplied from the condenser 12 through the refrigerant line 11 and flow the expanded refrigerant to the first heat-exchanger 14.

The refrigerant introduced into the first heat-exchanger 14 may be evaporated while being heat-exchanged with the coolant supplied from the electrical component 3 through the first coolant line 2. Thereafter, the refrigerant discharged from the first heat-exchanger 14 may flow into the fourth line 64.

The refrigerant flowing along the fourth line 64 may flow into the accumulator 19. Thereafter, the refrigerant may pass through the accumulator 19 and flow into the compressor 10.

Then, the heat pump system may repeatedly perform above-described processes.

That is, the refrigerant having passed through the first heat-exchanger 14 may flow into the compressor 10. The introduced refrigerant may be compressed by the operation of the compressor 10.

The refrigerant compressed in the compressor 10 may be supplied to the condenser 12 along the refrigerant line 11. The refrigerant supplied to the condenser 12 may increase the temperature of the ambient air introduced into the HVAC module.

The opening/closing door may be opened such that the ambient air introduced into the HVAC module and having passed through the evaporator 18 may pass through the condenser 12.

Accordingly, when passing through the evaporator 18 that is not supplied with the refrigerant, the ambient air introduced from the outside may be introduced into the evaporator 18 at a room temperature state without being cooled. Because the introduced ambient air is converted to a high-temperature state while passing through the condenser 12 and then introduced into the vehicle interior, the heating of the vehicle interior may be realized.

That is, the heat pump system may heat the vehicle interior without an operation of the gas injection device 50, while repeatedly performing such an operation.

In addition, according to the present disclosure, the waste heat may be recollected from the air or the electrical component 3 by the condenser 12 and the first heat-exchanger 14, and thereby the heating efficiency and performance may be improved while minimizing usage of a separate electric heater.

In addition, the operation according to fifth mode in which the vehicle interior is heated and dehumidified will be described with reference to FIG. 6.

Figure 6:
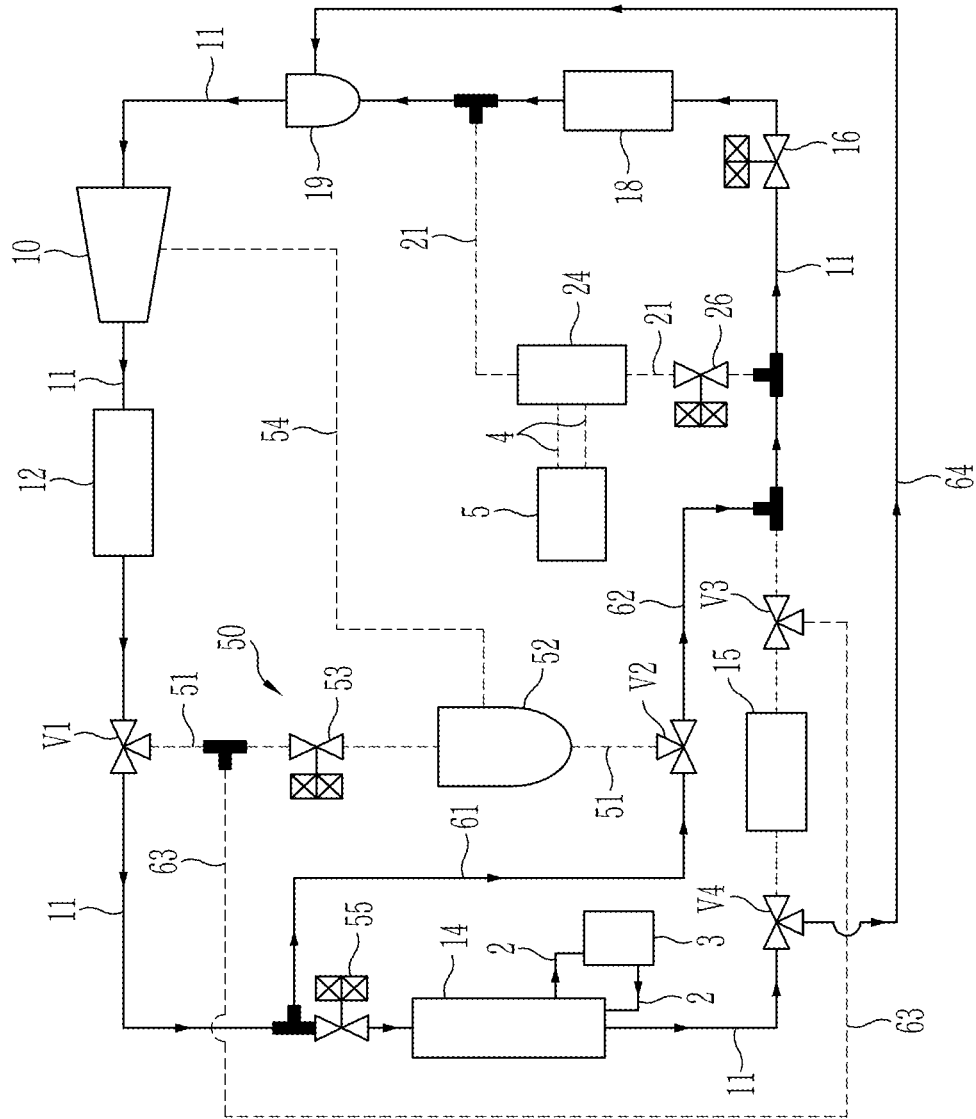
FIG. 6 is an operation diagram of a heat pump system for a vehicle according to an embodiment of the present disclosure, in a fifth mode.

FIG. 6 is an operation diagram of a heat pump system for a vehicle according to an embodiment of the present disclosure, in a fifth mode.

Referring to FIG. 6, in the case of the fifth mode, to heat and dehumidify the vehicle interior, the compressor 10 may be operated such that the refrigerant may flow along the refrigerant line 11.

The first refrigerant connection line 21 may be closed by the operation of the second expansion valve 26. The second refrigerant connection line 51 may be closed by the operation of the first valve V1.

The supply line 54 may be closed. The second expansion valve 26 and the third expansion valve 53 may stop operating.

Simultaneously, the first line 61 and the second line 62 may be opened by the operation of the second valve V2.

The third line 63 may be closed by the operation of the third valve V3. In addition, the fourth line 64 may be opened by the operation of the fourth valve V4.

The refrigerant line 11 connecting the second heat-exchanger 15 and the second end of the second line 62 may be closed by the operation of the fourth valve V4. At the same time, the refrigerant line 11 connecting the second end of the second line 62 and the evaporator 18 may be opened by the operation of the first expansion valve 16.

Then, the refrigerant supplied from the compressor 10 to the condenser 12 may flow along the refrigerant line 11.

A partial refrigerant among the refrigerant flowing from the condenser 12 along the refrigerant line 11 may flow along the first line 61 and the second line 62.

The refrigerant introduced into the second line 62 may flow into the first expansion valve 16 along the opened refrigerant line 11.

The first expansion valve 16 may expand the refrigerant supplied to the refrigerant line 11 and supply the expanded refrigerant to the evaporator 18. The refrigerant discharged from the evaporator 18 may flow into the accumulator 19.

A remaining refrigerant among the refrigerant flowing the condenser 12 along the refrigerant line 11 may flow into the fourth expansion valve 55. The fourth expansion valve 55 may expand the refrigerant supplied from the condenser 12 through the refrigerant line 11 and flow the expanded refrigerant to the first heat-exchanger 14.

The refrigerant introduced into the first heat-exchanger 14 may be evaporated while being heat-exchanged with the coolant supplied from the electrical component 3 through the first coolant line 2.

Then, the refrigerant discharged from the first heat-exchanger 14 may flow into the fourth line 64. The refrigerant flowing along the fourth line 64 may flow into the accumulator 19.

Then, the heat pump system may repeatedly perform above-described processes.

That is, the refrigerant having passed through the evaporator 18 and the refrigerant flowing along the fourth line 64 may pass through the accumulator 19 and flow into the compressor 10.

Accordingly, the refrigerant having passed through the first heat-exchanger 14 and the refrigerant having passed through the evaporator 18 may flow into the compressor 10. The introduced refrigerant may be compressed by the operation of the compressor 10.

The refrigerant compressed in the compressor 10 may be supplied to the condenser 12 along the refrigerant line 11. The refrigerant supplied to the condenser 12 may increase the temperature of the ambient air introduced into the HVAC module.

The opening/closing door may be opened such that the ambient air introduced into the HVAC module and having passed through the evaporator 18 may pass through the condenser 12.

Accordingly, the ambient air introduced into the HVAC module may be dehumidified by the low-temperature refrigerant introduced into the evaporator 18 while passing through the evaporator 18. Thereafter, because the air is converted to a high-temperature state while passing through the condenser 12 and then introduced into the vehicle interior, the vehicle interior may be smoothly heated and dehumidified.

Therefore, as described above, according to a heat pump system for a vehicle according to an embodiment, by employing the gas injection device 50 selectively operated in at least one mode selected for air conditioning of a vehicle interior to increase the flow amount of the refrigerant, cooling and heating performance may be improved.

In addition, according to an embodiment of the present disclosure, by using the chiller 24 where the coolant and the refrigerant is heat-exchanged, the temperature of a battery module 5 may be selectively adjusted efficiently in at least one mode.

In addition, according to an embodiment of the present disclosure, performance of the system may be maximized by using the gas injection device 50 while minimizing the number of required components, and thus streamlining and simplification of the system may be achieved.

In addition, according to an embodiment of the present disclosure, by efficiently adjusting the temperature of the battery module 5, the optimal performance of the battery module 5 may be enabled, and the overall travel distance of the vehicle may be increased due to the efficient management of the battery module 5.

In addition, according to an embodiment of the present disclosure, it is possible to reduce manufacturing cost and weight through simplification of an entire system, and to improve space utilization.

While the present disclosure has been described in connection with an example embodiment, it can be understood that the present disclosure is not necessarily limited to the disclosed example embodiment. On the contrary, the present disclosure is intended to cover various modifications and equivalent arrangements for other embodiments also included within the spirit and scope of the appended claims.

What is claimed is:

1. A heat pump system for a vehicle, comprising:
a compressor configured to compress a refrigerant;
a condenser connected to the compressor through a refrigerant line;
a first heat-exchanger connected to the condenser through the refrigerant line, the first heat-exchanger being configured to condensate or evaporate the refrigerant;
a second heat-exchanger connected to the first heat-exchanger through the refrigerant line;
a first expansion valve connected to the second heat-exchanger through the refrigerant line;
an evaporator connected to the first expansion valve through the refrigerant line;
a first refrigerant connection (FRC) line having a first FRC end connected to the refrigerant line between the compressor and the evaporator, and the FRC line having a second FRC end connected to the refrigerant line between the second heat-exchanger and the first expansion valve;
a chiller provided in the FRC line, the chiller being configured to adjust a temperature of a coolant by heat-exchanging the refrigerant introduced into the FRC line with a first selectively introduced portion of the coolant;
a second expansion valve provided upstream of the chiller in the FRC line; and
a gas injection device connected to the refrigerant line, the gas injection device being configured to selectively expand and flow the refrigerant supplied from the condenser or the refrigerant having passed through one of or both of the first heat-exchanger and the second heat-exchanger, and the gas injection device being configured to selectively supply a first partial amount of the refrigerant to the compressor to increase a flow amount of the refrigerant circulating the refrigerant line, wherein flowing movement of the refrigerant is controlled according to at least one mode for one or both of an interior temperature adjustment of a vehicle interior and a battery temperature adjustment of a battery module.

2. The heat pump system of claim 1, wherein the gas injection device comprises:
a first connection valve provided in the refrigerant line between the condenser and the first heat-exchanger;
a second refrigerant connection (SRC) line having a first SRC end connected to the first connection valve;
a gas-liquid separator provided in the SRC line, the gas-liquid separator being configured to separate and selectively discharge a gaseous state of the refrigerant and a liquid state of the refrigerant from the refrigerant that has been interiorly introduced;
a third expansion valve provided in the SRC line between the first connection valve and the gas-liquid separator;
a supply line having a first supply line end connected to the gas-liquid separator, and the supply line having a second supply line end connected to the compressor;
a fourth expansion valve provided in the refrigerant line between the first connection valve and the first heat-exchanger; and
a second connection valve provided in a second SRC end of the SRC line.

3. The heat pump system of claim 2, wherein the gas-liquid separator is configured to operate in response to the third expansion valve expanding and supplying the refrigerant in a state of cooling or heating the vehicle interior, and wherein the gas-liquid separator is configured to supply the gaseous state of the refrigerant to the compressor through the supply line to increase the flow amount of the refrigerant circulating the refrigerant line.

4. The heat pump system of claim 2, wherein the gas injection device further comprises:
a first line (FL) having a first FL end connected to the refrigerant line between the first connection valve and the fourth expansion valve, and the FL having a second FL end connected to the second connection valve;
a second line (SL) having a first SL end connected to the second connection valve, and the SL having a second SL end connected to the refrigerant line between the second heat-exchanger and the second FRC end of the FRC line;
a third connection valve provided in the refrigerant line between the second heat-exchanger and the second SL end of the SL; and
a third line (TL) having a first TL end connected to the third connection valve, and the TL having a second TL end connected to the SRC line between the first connection valve and the third expansion valve.

5. The heat pump system of claim 4, wherein the gas injection device further comprises:
a fourth connection valve provided in the refrigerant line between the first heat-exchanger and the second heat-exchanger; and
a fourth line (FRL) having a first FRL end connected to the fourth connection valve, and the FRL having a second FRL end connected to the refrigerant line between the evaporator and the compressor.

6. The heat pump system of claim 5, wherein the at least one mode comprises:
a first mode in which the gas injection device is operated and the battery module is cooled while the vehicle interior is cooled;
a second mode in which the gas injection device is operated and the vehicle interior is heated;
a third mode in which the gas injection device is not operated and the battery module is cooled while cooling the vehicle interior;
a fourth mode in which the gas injection device is not operated and the vehicle interior is heated; and
a fifth mode in which the vehicle interior is heated and dehumidified.

7. The heat pump system of claim 6, wherein, in the first mode, the heat pump system is configured so that:

the FRC line is opened by operation of the second expansion valve;
a portion of the SRC line connecting the first connection valve and the second TL end of the TL is closed by operation of the first connection valve;
a remaining portion of the SRC line connecting the second TL end of the TL and the second connection valve is opened by operation of the third expansion valve;
the supply line is opened;
the FL is closed by operation of the second connection valve;
the SL is opened by operation of the second connection valve;
the TL is opened by operation of the third connection valve;
the FRL is closed by operation of the fourth connection valve;
the refrigerant line connecting the condenser and the first heat-exchanger is opened by operation of the first connection valve and the fourth expansion valve;
the refrigerant line connecting the first heat-exchanger and the second heat-exchanger is opened by operation of the fourth connection valve;
the refrigerant line connecting the third connection valve and the second SL end of the SL is closed by operation of the third connection valve;
the first expansion valve expands the refrigerant introduced from the gas-liquid separator along the SL and the refrigerant line and supplies the expanded refrigerant to the gas-liquid separator;
the second expansion valve expands the refrigerant introduced into the FRC line and supplies the expanded refrigerant to the gas-liquid separator;
the third expansion valve expands the refrigerant supplied from the second heat-exchanger through the TL and supplies the expanded refrigerant to the gas-liquid separator;
the fourth expansion valve flows the refrigerant supplied through the refrigerant line to the first heat-exchanger without expansion; and
the gas-liquid separator is configured to supply the gaseous state of the refrigerant to the compressor through the supply line being opened, and to discharge the liquid state of the refrigerant to the SL through the second connection valve.

8. The heat pump system of claim 6, wherein, in the second mode, the heat pump system is configured so that:
the FRC line is closed by operation of the second expansion valve;
the SRC line is opened by operation of the first connection valve and the third expansion valve;
the supply line is opened;
the FL is opened by operation of the second connection valve;
the SL is closed by operation of the second connection valve;
the TL is closed by operation of the third connection valve;
the FRL is opened by operation of the fourth connection valve;
the refrigerant line connecting the condenser and the first heat-exchanger is closed by operation of the first connection valve;
the refrigerant line connecting the second heat-exchanger and the fourth connection valve is closed by operation of the fourth connection valve;
the refrigerant line connecting a rear end of the second heat-exchanger to the evaporator is closed by operation of the third connection valve and the first expansion valve;
the first expansion valve and the second expansion valve stop operating;
the third expansion valve expands the refrigerant supplied from the condenser and supplies the expanded refrigerant to the gas-liquid separator;
the fourth expansion valve expands the refrigerant supplied from the gas-liquid separator through the FL and supplies the expanded refrigerant to the gas-liquid separator; and
the gas-liquid separator supplies the gaseous state of the refrigerant to the compressor through the supply line being opened.

9. The heat pump system of claim 6, wherein, in the third mode, the heat pump system is configured so that:
the FRC line is opened by operation of the second expansion valve;
the SRC line is closed by operation of the first connection valve;
the supply line is closed;
the FL and the SL are closed by operation of the second connection valve;
the TL is closed by operation of the third connection valve;
the FRL is closed by operation of the fourth connection valve;
the first expansion valve expands the refrigerant introduced from the second heat-exchanger along the refrigerant line and supplies the expanded refrigerant from the first expansion valve to the gas-liquid separator;
the second expansion valve expands the refrigerant introduced into the FRC line and supplies the expanded refrigerant from the second expansion valve to the gas-liquid separator;
the third expansion valve stops operating; and
the fourth expansion valve flows the refrigerant supplied through the refrigerant line to the first heat-exchanger without expansion.

10. The heat pump system of claim 6, wherein, in the fourth mode, the heat pump system is configured so that:
the FRC line is closed by operation of the second expansion valve;
the SRC line is closed by operation of the first connection valve;
the supply line is closed;
the FL and the SL are closed by operation of the second connection valve;
the TL is closed by operation of the third connection valve;
the FRL is opened by operation of the fourth connection valve;
the refrigerant line connecting the second heat-exchanger and the fourth connection valve is closed by operation of the fourth connection valve;
the refrigerant line connecting a rear end of the second heat-exchanger to the evaporator is closed by operation of the third connection valve and the first expansion valve;
the first expansion valve, the second expansion valve, and the third expansion valve stop operating; and
the fourth expansion valve expands the refrigerant supplied from the condenser and flows the expanded refrigerant to the first heat-exchanger.

11. The heat pump system of claim 6, wherein, in the fifth mode, the heat pump system is configured so that:
the FRC line is closed by operation of the second expansion valve;
the SRC line is closed by operation of the first connection valve;
the supply line is closed;
the FL and the SL are opened by operation of the second connection valve;
the TL is closed by operation of the third connection valve;
the FRL is opened by operation of the fourth connection valve;
the refrigerant line connecting the second heat-exchanger and the second SL end of the SL is closed by operation of the fourth connection valve;
the refrigerant line connecting the second SL end of the SL and the evaporator is opened by operation of the first expansion valve;
a second partial flow of the refrigerant flows from the condenser along the refrigerant line, the first line, and the second line;
a third partial flow of the refrigerant introduced from the condenser along the refrigerant line flows into the fourth expansion valve;
the first expansion valve expands the refrigerant supplied to the refrigerant line and supplies the expanded refrigerant from the first expansion valve to the gas-liquid separator;
the second expansion valve and the third expansion valve stop operating; and
the fourth expansion valve expands the refrigerant supplied through the refrigerant line and flows the expanded refrigerant from the fourth expansion valve to the first heat-exchanger.

12. The heat pump system of claim 6, wherein the first heat-exchanger and the second heat-exchanger are configured to condense the refrigerant supplied in the first mode and the third mode.

13. The heat pump system of claim 6, wherein the first heat-exchanger is configured to evaporate the refrigerant supplied in the second mode, the fourth mode, and the fifth mode.

14. The heat pump system of claim 5, further comprising an accumulator provided in the refrigerant line between the evaporator and the compressor, wherein the second FRL end of the FRL is connected to the refrigerant line through the accumulator.

15. The heat pump system of claim 2, wherein the first expansion valve, the second expansion valve, the third expansion valve, and the fourth expansion valve are two-way expansion valves selectively operated in the at least one mode, and are configured to selectively expand the refrigerant while controlling flowing of the refrigerant.

16. The heat pump system of claim 1, wherein the first heat-exchanger is connected to an electrical component through a first coolant line through which the coolant circulates.

17. The heat pump system of claim 1, wherein the chiller is connected to the battery module through a second coolant line through which the coolant circulates.

18. The heat pump system of claim 17, wherein the heat pump system is configured so that the second coolant line is opened to connect the chiller and the battery module for cooling the battery module.

19. A heat pump system for a vehicle, comprising:
a compressor configured to compress a refrigerant;
a condenser connected to the compressor through a refrigerant line;
a first heat-exchanger connected to the condenser through the refrigerant line;
a second heat-exchanger connected to the first heat-exchanger through the refrigerant line;
a first expansion valve connected to the second heat-exchanger through the refrigerant line;
an evaporator connected to the first expansion valve through the refrigerant line;
a first refrigerant connection (FRC) line having a first FRC end connected to the refrigerant line between the compressor and the evaporator, and the FRC line having a second FRC end connected to the refrigerant line between the second heat-exchanger and the first expansion valve;
a chiller provided in the FRC line;
a second expansion valve provided upstream of the chiller in the FRC line; and
a gas injection device connected to the refrigerant line, the gas injection device being configured to selectively expand and flow the refrigerant supplied from the condenser or the refrigerant having passed through one of or both of the first heat-exchanger and the second heat-exchanger, and the gas injection device being configured to selectively supply a first partial amount of the refrigerant to the compressor to increase a flow amount of the refrigerant circulating the refrigerant line, wherein the heat pump system is configured such that flow movement of the refrigerant is controlled according to one of five modes relating to one or both of an interior temperature adjustment of a vehicle interior and a battery temperature adjustment of a battery module.

20. The heat pump system of claim 19, wherein the heat pump system is configured such that:
in a first mode of the five modes, the gas injection device is operated and the battery module is cooled while the vehicle interior is cooled;
in a second mode of the five modes, the gas injection device is operated and the vehicle interior is heated;
in a third mode of the five modes, the gas injection device is not operated and the battery module is cooled while cooling the vehicle interior;
in a fourth mode of the five modes, the gas injection device is not operated and the vehicle interior is heated; and
in a fifth mode of the five modes, the vehicle interior is heated and dehumidified.

* * * * *